May 12, 1925.

W. J. RIDDELL 1,537,139

MOUNTING OF THE WHEELS OF VEHICLES

Original Filed June 14, 1920

Inventor
Walter Joseph Riddell,
By B. Singer,
Attorney

Patented May 12, 1925.

1,537,139

UNITED STATES PATENT OFFICE.

WALTER JOSEPH RIDDELL, OF NORTH SYDNEY, NEW SOUTH WALES, AUSTRALIA.

MOUNTING OF THE WHEELS OF VEHICLES.

Original application filed June 14, 1920, Serial No. 388,976. Divided and this application filed October 18, 1921. Serial No. 508,557.

*To all whom it may concern:*

Be it known that I, WALTER JOSEPH RIDDELL, a subject of the King of Great Britain and Ireland, residing at 72 Berry Street, North Sydney, in the State of New South Wales, Commonwealth of Australia, have invented certain new and useful Improvements in and Relating to the Mounting of the Wheels of Vehicles (for which I have obtained British Patent No. 148,554), of which the following is a specification.

The purpose of this invention is to facilitate the starting and improve the riding qualities of wheeled vehicles, and in the case of automobile vehicles to soften the effect on the driving wheels.

The invention consists mainly in improved means for so mounting a wheel of a vehicle in relation to the body thereof, that the latter is free to move forwardly and upwardly in an arc relatively to the wheel center under the influence of the impelling or tractive force, so that the wheel when temporarily lagging, is as it were pulled over the road surface or an obstruction thereon with consequent comparative ease and avoidance of shock.

The invention also consists in other novel features as will be apparent from the following description, and as specified in the appended claim.

According to this invention a wheel of a vehicle instead of being mounted upon or in line with the vehicle axle, may be mounted upon a stub axle carried on the swinging upper end of a link or crank which at its lower end is rotatably mounted upon a fixed axle.

The invention is applicable to the driving and steering wheels of automobiles with the equally advantageous effect as regards the easy riding of the vehicle and the starting thereof.

This application is a division of my copending application for Letters Patent of the United States, filed June 14, 1920, Serial No. 388,976.

In the accompanying drawings:—

Figure 1:
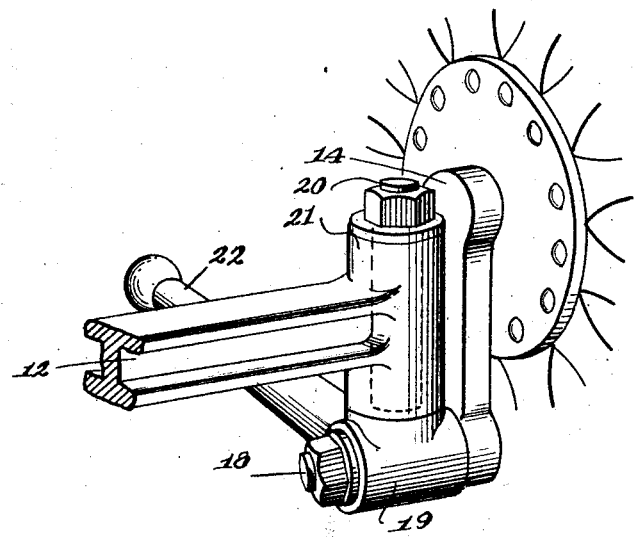
Figure 2:
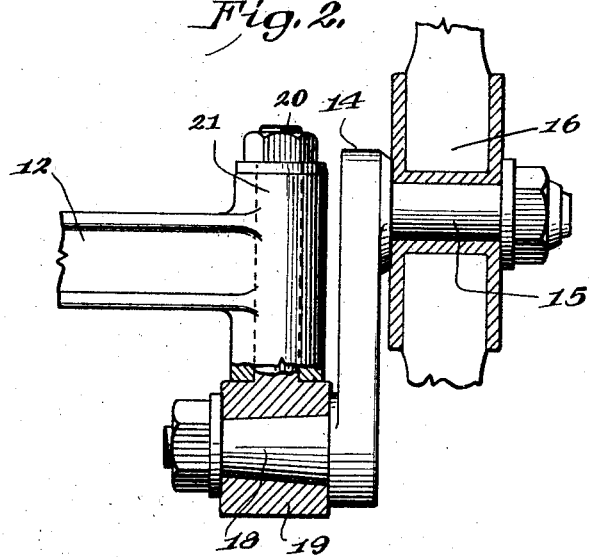

Figs. 1 and 2 show respectively in perspective and in elevation partly in section, the application of the invention to a steering wheel of an automobile.

Referring to the drawing in which the same reference numerals are used to indicate corresponding parts, an axle is indicated at 12 and a wheel at 16 mounted on a stub axle 15 which projects from the upper swinging end of the crank 14. Said crank 14 is integral with a pin 18 rotatably mounted in a socket 19 on the lower end of a swivel pin 20 vertically mounted in the knuckle 21, and rotated therein as required by the arm 22 connected to the steering mechanism (not shown) in known manner.

The normal position of the pivot 18 is vertically below the wheel center or stub axle but when tractive or propulsive effort is applied to the vehicle body or framework as in starting the vehicle, the pivotal axis formed by the pin 18 advances in an arc, relatively to the wheel center and the wheel is as it were dragged after the pivotal axis. Similarly when the wheel meets an obstruction the wheel tends to lag and the pivotal axis moving forwardly, the wheel is dragged over the obstruction.

The angle with the vertical which the crank assumes depends upon the resistance to the rotational forward movement of the wheel, the greater the resistance the greater the angle of crank and the greater the dragging effect on the wheel.

As regards the enhanced ease in the riding of the vehicle, the effect of my means for mounting the wheels is that when a wheel meets an obstruction, the body of the vehicle is raised in an arc, instead of vertically upwards, as is the case with the ordinary wheel mounting.

It is to be understood that I do not confine myself to the form of the invention herein described with reference to the accompanying drawing, as without departing from the principle of the invention, other constructions may be employed embodying the essential feature of this invention which is mounting a wheel so that its axis is free to oscillate about a pivotal point located below the wheel center, for the purpose hereinbefore set forth and as hereinafter claimed.

What I claim and desire to secure by Letters Patent is:—

In an automobile, a front axle having a steering knuckle the bore of which is vertical, a vertical swivel pin in the bore of the knuckle, a bearing member on the lower end of said swivel pin and the bore of which is horizontal, a crank having a horizontal pivot pin at its lower end mounted in the bore of the bearing member for swinging movement of said crank, a stub axle extending horizontally from the upper portion of the crank and arranged for the mounting of a vehicle wheel thereon, and a steering arm extending from the socket member of the vertical pivot pin.

In witness whereof I affix my signature.

WALTER JOSEPH RIDDELL.